Patented Aug. 7, 1923.

1,463,913

UNITED STATES PATENT OFFICE.

FRANCIS B. STUART AND CHARLES A. RIVERS, OF EL PASO, TEXAS; ARA M. RIVERS ADMINISTRATRIX OF SAID CHARLES A. RIVERS, DECEASED.

PROCESS OF DEHYDRATING GYPSUM.

No Drawing.     Application filed March 29, 1919. Serial No. 286,694.

*To all whom it may concern:*

Be it known that we, FRANCIS B. STUART and CHARLES A. RIVERS, citizens of the United States, and residents of El Paso, in the county of El Paso and State of Texas, have invented certain new and useful Improvements in the Processes of Dehydrating Gypsum, of which the following is a specification.

This invention relates to an improved process of dehydrating gypsum and comprehends a simple and inexpensive process of this character whereby the moisture content of the gypsum is thoroughly removed and the gypsum calcined to be later broken up or crushed in the usual manner to produce what is commercially known as plaster of Paris.

The improved process forming the subject matter of this application contemplates the subjection of the gypsum to steam pressure, whereby the possibility of burning of the gypsum, as frequently occurs when the moisture content is evaporated by means of dry heat, will be entirely obviated.

It is also an important object of the invention to effect a material economy in the use of fuel and to provide a process which will also admit of the dehydration of the gypsum in rock form, whereby considerable waste which is incident to the breaking or crushing of the gypsum prior to calcination will be obviated.

With the above and other objects in view, the invention consists in the several steps of our improved process, which we will hereinafter more fully describe and particularly point out in the subjoined claims.

In the dehydration or calcination of gypsum, it has heretofore been a common practice to first break up the rock gypsum and then heat the small particles by means of an open fire, so as to drive out or evaporate the moisture content. This process is wasteful and also quite expensive. It necessitates the employment of skilled and experienced help to carefully watch and examine the material at intervals to see that the required degree of heat is at all times applied and to prevent burning which would result in imperfect calcination. Also by such heating process, small particles of gypsum are carried off by the escaping steam. It has been found that this results in a loss of subtantially twenty per cent.

The above noted objections to the heating process, which is now in general use, have been successfully overcome by means of the present invention. It has been commonly supposed that gypsum cannot be dehydrated and calcined by the use of steam. We have, however, demonstrated to our entire satisfaction that this can be done and that the steam process to be presently described also results in a better and cheaper product.

In carrying out our invention in practice, we place the gypsum, preferably in rock form, in steel cars and run the cars into cylinders having a diameter of about six feet. After bolting on the cylinder head, steam is let into the cylinder until a pressure of approximately one hundred and fifty pounds per square inch is registered. Steam is maintained at this pressure for a period of approximately four hours, the length of time depending largely upon the physical structure of the gypsum to be calcined. At the expiration of this period the steam supply is shut off and after the pressure within the cylinder has considerably reduced, the balance of the steam is blown off. Upon the removal of the car from the cylinder it will be found that the gypsum has been uniformly dehydrated or relieved of its water content, and it is now ready to be crushed and pulverized. For this purpose, pulverizing machines, such as are generally employed, may be used. The material in this form is commercially known as plaster of Paris and is mixed with other substances in the manufacture of hollow tile and other products in which gypsum is a primary constituent. It will be apparent that by means of the steam process above described, a considerable saving in the consumption of fuel may be realized over the old fire process. Further, it is only necessary to employ a single fireman to attend to the series of boilers and all danger of the gypsum being over or under heated is precluded. By forcing out the water by means of steam pressure, we obviate loss of the gypsum as is occasioned in the use of the fire or heating process above referred to, as no part of the gypsum will be carried out. There will, however, be a minimum loss in weight due only to the removal of the water.

From the foregoing, it will be appreciated that we have devised a process of dehydrating gpsum which is of greatly increased utility over other processes for this purpose as now known in the art. We have herein specified a certain steam pressure to be maintained upon the gypsum, but it is understood, of course, that there may be considerable variation within certain limits in this pressure. Neither do we desire that the invention should be limited to the application of steam pressure to rock gypsum alone, since, if desired, the gypsum may first be crushed or broken. However, we have found in practice that by treating the gypsum in rock form, it may be much more easily broken and pulverized after it is calcined. It is accordingly to be understood that we reserve the privilege of resorting to such variations in our improved process as may be fairly embodied within the spirit and scope of the invention as claimed.

We claim:

1. A process of dehydrating gypsum which consists in subjecting rock gypsum to steam pressure at approximately one hundred and fifty pounds for a period of approximately four hours, then shutting off the steam and after a reduction of the steam pressure by condensation, blowing off the remaining steam.

2. That method of dehydrating gypsum which consists in subjecting rock gypsum in a closed container to steam pressure during a predetermined period of time, closing off the steam supply after such period of time has elapsed to gradually reduce the pressure by condensation, and then blowing off the remaining steam.

3. That method of dehyrating gypsum which consists in placing rock gypsum in a closed container above the bottom thereof, introducing steam to the container for a predetermined period of time, and closing off the steam supply after such period of time has elapsed to gradually reduce the pressure by condensation.

In testimony that they claim the foregoing as their invention, have signed their names hereunder.

FRANCIS B. STUART.
CHARLES A. RIVERS.